US010827227B2

(12) United States Patent
Thomas et al.

(10) Patent No.: US 10,827,227 B2
(45) Date of Patent: Nov. 3, 2020

(54) METHODS AND SYSTEMS OF FACILITATING SHARING OF INFORMATION AMONG SERVICE PROVIDERS

(71) Applicant: Rovi Guides, Inc., San Jose, CA (US)

(72) Inventors: William L. Thomas, Evergreen, CO (US); Walter R. Klappert, Los Angeles, CA (US); Richard M. Beaty, Mannford, OK (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/394,581

(22) Filed: Apr. 25, 2019

(65) Prior Publication Data

US 2019/0356962 A1    Nov. 21, 2019

Related U.S. Application Data

(63) Continuation of application No. 15/077,462, filed on Mar. 22, 2016, now Pat. No. 10,299,006.

(51) Int. Cl.
| | |
|---|---|
| *H04N 21/482* | (2011.01) |
| *H04N 21/25* | (2011.01) |
| *H04N 21/258* | (2011.01) |
| *H04N 21/2665* | (2011.01) |
| *H04N 21/45* | (2011.01) |
| *H04N 21/442* | (2011.01) |
| *H04N 21/472* | (2011.01) |

(52) U.S. Cl.
CPC ....... *H04N 21/4826* (2013.01); *H04N 21/251* (2013.01); *H04N 21/25891* (2013.01); *H04N 21/2665* (2013.01); *H04N 21/44213* (2013.01); *H04N 21/4532* (2013.01); *H04N 21/472* (2013.01)

(58) Field of Classification Search
CPC combination set(s) only.
See application file for complete search history.

(56) References Cited

U.S. PATENT DOCUMENTS

| | | | |
|---|---|---|---|
| 8,661,472 B1* | 2/2014 | Kardatzke | H04N 21/482 725/48 |
| 9,596,503 B1* | 3/2017 | Greene | H04N 21/2343 |
| 2007/0149174 A1* | 6/2007 | Torvinen | H04M 15/00 455/412.1 |
| 2009/0172551 A1* | 7/2009 | Kane | G06Q 30/02 715/733 |
| 2014/0130097 A1* | 5/2014 | Londero | H04N 21/47202 725/48 |
| 2014/0223480 A1* | 8/2014 | Berry | H04N 21/4826 725/40 |
| 2015/0074700 A1* | 3/2015 | Danovitz | H04N 21/6175 725/14 |

* cited by examiner

Primary Examiner — Alexander Gee
(74) Attorney, Agent, or Firm — Haley Guilliano LLP

(57) ABSTRACT

Methods and systems for a media guidance application that aggregates media content and media guidance data for users. For example, the media guidance application may aggregate content from numerous providers and provide the content through a single interface. Moreover, the media guidance application described herein may provide service providers with finder's fees for sharing information about media assets that users are interested in viewing.

20 Claims, 8 Drawing Sheets

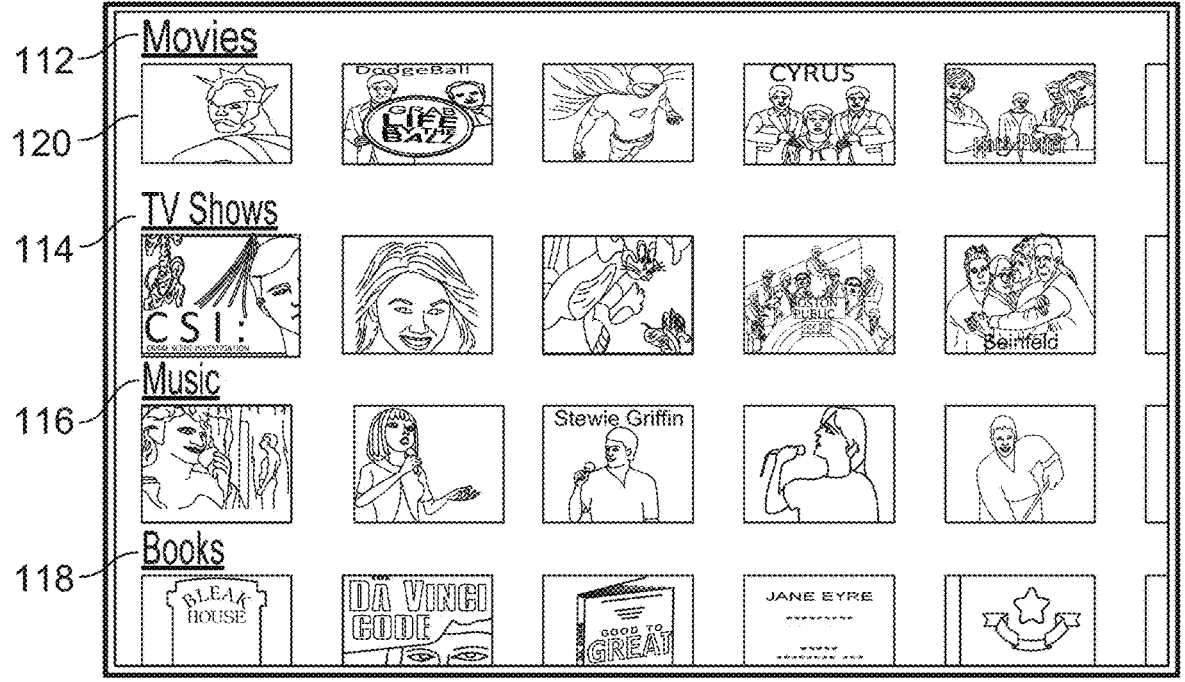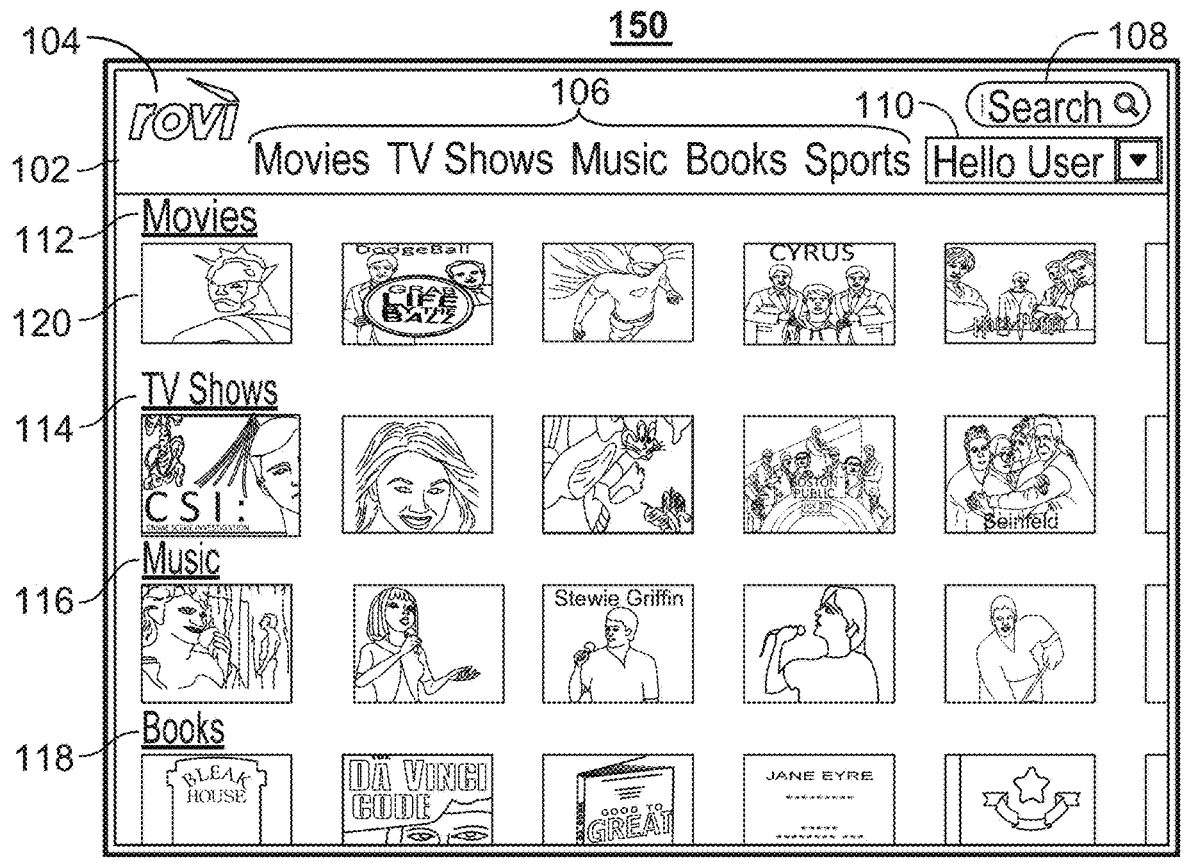
FIG. 1

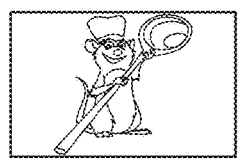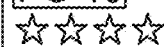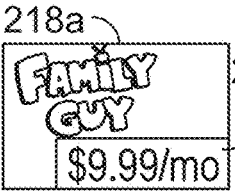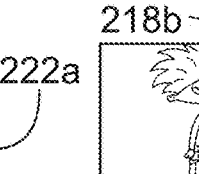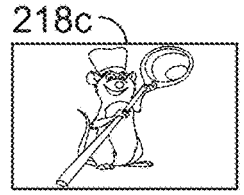
FIG. 2

900

| | |
|---|---|
| 900 | ... |
| 901 | Initialization Subroutine |
| 902 | ... |
| 903 | //Routine to transmit an instruction to recommend the media asset without indicating the content provider to the user: |
| 904 | |
| 905 | Retrieve content provider identifiers, each associated with a content provider from which the media asset is available |
| 906 | For each content provider identifier: |
| 907 |    Retrieve the user's subscription to the content provider associated with the content provider identifier from the user profile |
| 908 | |
| 909 |    If (user subscribes to content provider) |
| 910 |      Execute Subroutine to transmit an instruction to generate for display, on the display device, a media asset identifier associated with the media asset without indicating the content provider to the user |
| 911 | |
| 912 | If (user does not subscribe to any of the content providers) |
| 913 |    Execute Subroutine to transmit an instruction to generate for simultaneous display, on the display device, a media asset identifier associated with the media asset and a price associated with subscribing to the content provider without indicating the content provider to the user |
| 914 | ... |
| 915 | Termination Subroutine |
| 916 | ... |

FIG. 9

METHODS AND SYSTEMS OF FACILITATING SHARING OF INFORMATION AMONG SERVICE PROVIDERS

CROSS-REFERENCE TO RELATED APPLICATIONS

This application is a continuation of U.S. patent application Ser. No. 15/077,462, filed Mar. 22, 2016, the disclosure of which is hereby incorporated by reference herein in its entirety.

BACKGROUND

In conventional systems, users have access to a plethora of media content from a plurality of content providers. Unfortunately, to access this media content from a plurality of content providers, users often must individually subscribe to and manage accounts with the various content providers. Moreover, even after subscribing to each of the content providers, users must individually search the media content libraries of each content provider to find content to consume.

SUMMARY

Accordingly, methods and systems are described herein for a media guidance application that solves the aforementioned problems by aggregating media content for users. Specifically, the media guidance application may automatically subscribe to, and/or manage accounts with, the various content providers for a user. Moreover, users may search the media content libraries of each content provider to find content to consume simultaneously.

For example, the media guidance application may aggregate content from numerous providers and provide the content through a single interface. The single interface may further facilitate coordination between various content providers by allowing users to simultaneously search through the media content libraries of each content provider and receive media recommendations without indicating the content provider associated with any one media asset. For example, by not indicating the content provider associated with particular media assets, competition between content providers may give way to coordination. For example, by not indicating the content provider associated with any one media asset, users are prevented from favoring one content provider over another, which may lead to a user canceling a subscription to a disfavored content provider. In a related example, removing a threat of subscription cancelation removes an impediment for content providers to not share user profile information (e.g., indicating which content is preferred or not preferred by a user) with other content providers. For example, the content providers can work together to recommend media content most desired by a user, even if that media content is not provided by them.

Accordingly, the media guidance application may recommend a media asset from any of the plurality of content providers to a user based on a user profile that is aggregated from the plurality of content providers. For example, the media guidance application may determine that a movie, "Family Guy Movie," is of interest to a user based on a user profile and is available from a first content provider. The media guidance application may further identify that the actual movie, "Family Guy Movie," is available from a second content provider. The media guidance application may recommend the movie, "Family Guy Movie," to the user through an interface that does not indicate that the information used to select the movie came from the first content provider nor that the actual movie came from the second content provider.

In some aspects, the media guidance application may function as a cloud-based aggregator of media content. The media guidance application may receive, at a server, a request from a user, over a communications network, to access media assets from the cloud-based aggregator, wherein the media assets are available from a plurality of content providers. For example, the media guidance application may receive a request from a user to access movies. The media guidance application may retrieve, at the server, a user profile corresponding to the user. For example, the media guidance application may retrieve the user's profile including data about the user's preferences and interests.

The media guidance application may identify, at the server, a media asset based on the user profile from a content provider of the plurality of content providers. For example, the media guidance application may identify a movie available from at least one of the plurality of content providers that is of interest to the user by using the data in the user's profile. The media guidance application may transmit, over the communications network, an instruction to recommend, on a display screen, the media asset without indicating the content provider to the user. For example, the media guidance application may transmit an instruction to display a recommendation of the movie to the user, without indicating the content provider from which the movie is available.

In some embodiments, the communications network may utilize an Internet protocol suite. For example, the communication may utilize the Transmission Control Protocol (TCP) and the Internet Protocol (IP).

In some embodiments, the media assets may include a first media asset available from a first content provider of the plurality of content providers and a second media asset available from a second content provider of the plurality of content providers. For example, the media assets may include a movie from a first content provider and a song from a different content provider.

In some embodiments, the user profile may be an aggregated user profile from the first content provider and the second content provider. For example, the user profile may be a combination of the user's profiles with each content provider. For example, the user profile may include the user's movie preferences in the user profile retrieved from one or more content providers that provides movies, and the user's music preferences in the user profile retrieved from one or more content providers that provide music.

In some embodiments, the media guidance application may identify the media asset based on the user profile by retrieving a plurality of media assets available from the plurality of content providers. For example, the media guidance application may retrieve a list of all the movies available from the plurality of content providers. The media guidance application may determine whether metadata associated with each of the plurality of media assets matches data in the user profile. For example, the media guidance application may compare the genre, rating, and description of each movie with data in the user profile indicating what genres, ratings, and keywords the user has an interest in. The media guidance application may select the media asset based on determining that the media asset has metadata that matches the data in the user profile. For example, the media guidance application may select the movie that is of greatest interest to the user based on a metadata tag that indicates the movie is of the greatest interest to the user.

In some embodiments, the instruction to recommend the media asset without indicating the content provider to the user may further comprise an instruction to generate for simultaneous display, on the display device, a media asset identifier associated with the media asset and a logo associated with the cloud-based aggregator. For example, the media guidance application may generate for display a link to the movie and the logo of the cloud-based aggregator without generating for display an indication of the content provider from which the movie is available.

In some embodiments, the cloud-based aggregator may require a subscription. For example, the cloud-based aggregator may require users to pay a monthly fee to use the aggregator.

In some embodiments, the user profile may include the user's subscription information for each content provider of the plurality of content providers. For example, the user profile associated with a user may include the information about the user's subscriptions to the different content providers. For example, the user profile may include the type of subscription the user has with the content provider and authentication information (e.g., username, password).

In some embodiments, the media guidance application may monitor the user's activity on the cloud-based aggregator. For example, the media guidance application may monitor the media assets that a user views as well as the amount of time the user views each media asset. The media guidance application may update the user profile based on the user's activity. For example, the media guidance application may update the user profile to include movies the user has viewed and the amount of time the user viewed each movie. The media guidance application may transmit data in the user profile to a content provider of the plurality of content providers. For example, the media guidance application may transmit the list of movies that a user has viewed to one of the content providers.

In some embodiments, the media guidance application may transmit an instruction to recommend the media asset without indicating the content provider to the user by identifying content providers from which the media asset is available. For example, the media guidance application may identify the content providers from which the movie is available. The media guidance application may determine whether the user subscribes to at least one content provider of the content providers from which the media asset is available. For example, the media guidance application may determine whether any of the content providers that the user subscribes to offers the movie.

The media guidance application may, in response to determining that the user subscribes to at least one content provider of the content providers from which the media asset is available, transmit an instruction to generate for display, on the display device, a media asset identifier associated with the media asset without indicating the at least one content provider to the user. For example, the media guidance application may, in response to determining that the user subscribes to a content provider that offers the movie, generate for display a recommendation of the movie without indicating the content provider.

The media guidance application may, in response to determining that the user does not subscribe to at least one content provider of the content providers from which the media asset is available, transmit an instruction to generate for simultaneous display, on the display device, a media asset identifier associated with the media asset and a price associated with subscribing to one of the at least one content provider without indicating the content provider to the user. For example, the media guidance application may, in response to determining that the user does not subscribe to a content provider that offers the movie, generate for simultaneous display a recommendation of the movie and a price associated with subscribing to a content provider that offers the movie.

In some embodiments, the cloud-based aggregator includes a database listing a plurality of media asset identifiers associated with media assets available from the plurality of content providers, wherein each media asset identifier is associated with content provider identifiers, each corresponding to a content provider from which the media asset associated with the media asset identifier is available. For example, the cloud-based aggregator may include a database of all movies available from all the content providers, associating each movie with the content providers from which the movie is available.

In some embodiments, the media guidance application may provide service providers with a finder's fee for sharing information about media assets that a user is interested in viewing. Whereas service providers are usually in direct competition with one another and would find it disadvantages to share information directly with one another, an aggregator coordinating the information among service providers makes sharing information beneficial for all parties. First, the users have the benefit of receiving recommendations of media assets that they desire or are interested in. Second, the service provider transmitting user information receives a benefit from the aggregator such as a monetary fee or recommendation credit without sending users to competing service providers. Third, the service providers benefit from recommendations of their media assets because users are directed to use their services.

The media guidance application may receive information identifying a media asset of interest to a user from a first service provider. For example, the media guidance application may receive information from a first online streaming media provider identifying a movie that a user is interested in watching. The media guidance application may determine that the media asset is available from a second service provider. For example, the media guidance application may determine that the movie is available to watch from a second online streaming media provider. The media guidance application may inform the user that the media asset is available from the second service provider. For example, the media guidance application may generate for display a recommendation of the movie including information about its availability from the second online streaming media provider. The media guidance application may receive a user input to access the media asset from the second service provider. For example, the user may click on the recommendation to access the movie from the second online streaming media provider.

The media guidance application may receive compensation from the second service provider for directing the user to use the second service provider's service. For example, the media guidance application may receive a fee from the second online streaming media provider for directing the user to watch the movie. The media guidance application may share the compensation with the first service provider. For example, the media guidance application may share the fee received from the second online streaming media provider with the first online streaming media provider.

In some embodiments, the media guidance application may recommend media content to users based on the users' media preferences. The media guidance application may receive, at a server, a request from a user, over a communications network, to access media assets from a first content provider, wherein the first content provider is associated with a cloud-based aggregator of a plurality of content providers. For example, the media guidance application may receive a request from the user to access a movie on a first online streaming media provider. The media guidance application may determine, at the server, a media preference for the user based on the request. For example, the media guidance application may determine the media preference to be the movie.

The media guidance application may retrieve, at the server, a list of media assets available from each of the plurality of content providers. For example, the media guidance application may retrieve a list of movies available from all of the content providers associated with the cloud-based aggregator. The media guidance application may identify, at the server, a media asset available from a second content provider based on the media preference, wherein the second media provider is associated with the cloud-based aggregator. For example, the media guidance application may identify the movie as being available from a second online streaming media provider that is associated with the cloud-based aggregator. The media guidance application may transmit, over the communications network, a recommendation, on a display screen, for the media asset without indicating the second content provider to the user. For example, the media guidance application may transmit a recommendation of the movie from the second online streaming media provider, to be displayed for the user without indicating that the source of the movie is the second online streaming media provider.

The media guidance application may receive, at the server, a first recommendation credit from the cloud-based aggregator in response to transmitting the recommendation. For example, the media guidance application may receive a recommendation credit for the first online streaming media provider for transmitting the recommendation of the movie.

In some embodiments, the media preference uniquely identifies a media asset that is of interest to the user. For example, the media preference may be the title of a movie, or any other identifier of the media asset.

In some embodiments, the media preference includes media asset attributes that the user is interested in. For example, the media preference may include a media asset type, genre, rating, length, cast and crew, etc. that the user is interested in. For example, the media preference may be a list of media asset attributes such as movie, comedy, R-rated, and Tom Hanks.

In some embodiments, the media asset is not available from the first content provider. For example, the movie that the user is interested in watching may not be available from the first online streaming media provider.

In some embodiments, the recommendation includes a link to the media asset from the second content provider. For example, the recommendation may include a link that the user may click on to view the media asset from the second content provider.

In some embodiments, the first recommendation credit is a monetary fee. For example, the first recommendation credit may be a digital payment. For example, the first recommendation credit may be money that is exchanged digitally.

In some embodiments, the first recommendation credit is a digital credit added to an account associated with the first content provider. For example, the media guidance application may add and subtract recommendation credits from an account associated with the first content provider, keeping track of the total amount of recommendation credits that the first content provider possesses. The digital credits may be exchanged for money or other benefits. In some embodiments, the digital credits may be exchanged at the request of the content provider. In some embodiments, the digital credits may be exchanged at the end of a predetermined time period.

In some embodiments, the cloud-based aggregator receives a second recommendation credit from the second content provider. For example, after recommending a movie from the second online streaming media provider to a user, the media guidance application may receive a recommendation credit from the second online streaming media provider. In some embodiments, the second recommendation credit is of greater than or equal to the value of the first recommendation credit.

In some embodiments, the media guidance application may generate for display, on the display screen, a menu, associated with the cloud-based aggregator, for receiving requests from the user to access media assets from the first content provider, wherein the menu does not indicate that the media assets are from the first content provider. For example, the media guidance application may generate for display, on the user's display, a menu of media assets available from the first online streaming media provider, without indicating that the media assets are available from the first online streaming media provider.

In some embodiments, the media guidance application may receive from the cloud-based aggregator a verification of a right of the first user to access media assets from the second content provider. For example, the media guidance application may receive, from the cloud-based aggregator, verification that the user has the right to access media assets from a second online streaming media provider. The media guidance application may, in response to receiving from the cloud-based aggregator the verification of the right of the second user to access media assets from the first content provider, search for the media asset available from the second content provider based on the media preference. For example, after verifying that the user has the right to access media content from the second online streaming media provider, the media guidance application may search the second online streaming media provider for the media asset that the user is interested in.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative media listing display that may be used to provide media listings from a plurality of content providers to users in a single interface in accordance with some embodiments of the disclosure;

FIG. 2 shows another illustrative display that may be used to provide a media asset and recommendations of other media assets in accordance with some embodiments of the disclosure;

FIG. 9 is an illustrative example of pseudocode for determining whether the user subscribes to a content provider from which the media asset is available and transmitting an instruction to recommend the media asset in accordance with some embodiments of the disclosure.

DETAILED DESCRIPTION OF THE DRAWINGS

Figure 3:
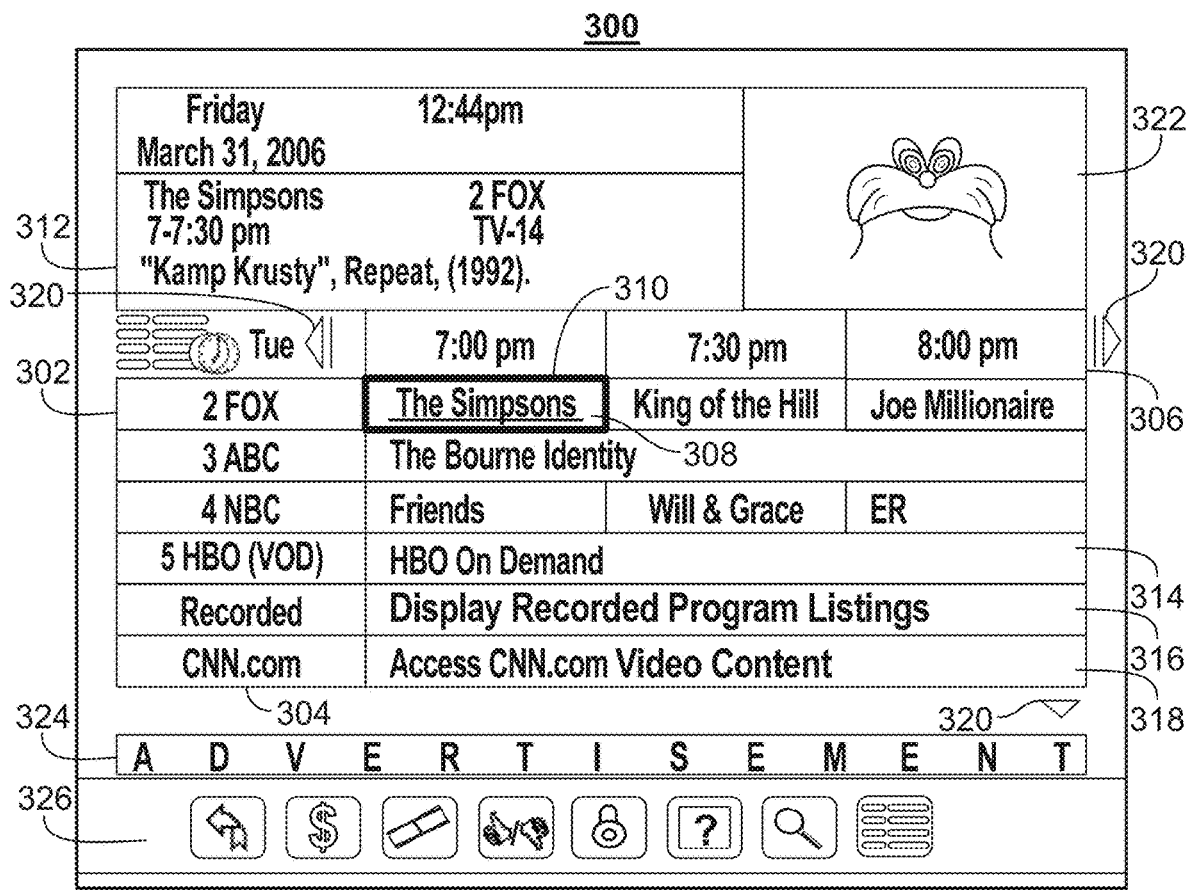
FIG. 3 shows another illustrative media listing display in accordance with some embodiments of the disclosure.

Methods and systems are described herein for a media guidance application that aggregates media content for users viewing over-the-top content. For example, the media guidance application may aggregate content from numerous providers and provide the content through a single interface. Moreover, the media guidance application described herein may identify a media asset available from at least one of a plurality of content providers, and may recommend the media asset to the user without indicating the content provider from which the media asset is available.

For example, the media guidance application may recommend "Family Guy Movie," a movie that is determined to be of interest to a user based on a user profile and is available from certain content providers. The media guidance application may identify content providers from which "Family Guy Movie" is available. The media guidance application may then determine whether the user subscribes to any of the content providers. If the media guidance application determines that the user subscribes to at least one of the content providers, then the media guidance application may generate for display a media listing of the movie without indicating any of the content providers from which it is available. If the media guidance application determines that the user does not subscribe to any of the content providers, then the media guidance application may generate for simultaneous display a media listing of the movie and a price associated with subscribing to a content provider from which the movie is available, without indicating the content provider to the user. In another example, a user may search for a certain media asset directly (e.g., using search box 108 (FIG. 1)).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One type of content is over-the-top content. As referred to herein, "over-the-top content" or "OTT content" is media content delivered over a network using Internet technology (e.g., via the Internet or a managed network). In some embodiments, OTT content may be delivered without the involvement of a multiple-system operator in the control or distribution of the content. For example, OTT content may include a media asset (e.g., a movie) that is streamed to a user over the Internet.

In some embodiments, the OTT content may be provided through a platform that aggregates content from numerous providers. A platform that provides such a feature may be referred to as a super aggregator or a content aggregator or, sometimes, cloud-based aggregator. For example, the super aggregator may provide a single interface through which a user may access, search, and/or otherwise receive information about media content from numerous media content providers and media guidance data from a media guidance data source. Such an interface is referred to herein as a media guidance application.

As referred to herein, "content providers," or "service providers," are third-party entities that provide media content. For example, content providers may be third-party entities that provide movies, music, and other media content to users. A content provider may be unaffiliated with the cloud-based aggregator. A content provider may be in a contractual relationship with the cloud-based aggregator. For example, the content provider may be in an agreement to provide the cloud-based aggregator with information about users in return for some compensation. A content provider may be in a contractual relationship with the user and not the cloud-based aggregator. For example, the content provider may be subscribed to by users and may not have any agreement with the cloud-based aggregator.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by content type, by category (e.g., movies, sports, news, children, or other categories of programming), or other predefined, user-defined, or other organization criteria.

FIG. 1 shows an illustrative media listing display that may be used to provide media listings from a plurality of content providers to users in a single interface. Display 100 includes rows 112, 114, 116, and 118 each of which includes cells of selectable media listings, such as movie 120. The selectable media listings may include titles or other text below the images. The selectable media listings may be provided by a plurality of content providers. The content providers for the various selectable media listings may not be shown.

Display 150 includes header 102 with: (1) logo 104, which may be associated with the super aggregator; (2) selectable options 106 for selecting content by type, genre, and/or other organization criteria; (3) search box 108 for searching content by text; and (4) user settings 110 for accessing and editing user information and preferences. Rows 112, 114, 116, and 118 include cells of selectable media listings, such as movie 120, where each selectable media listing provides graphical images including cover art, still images from the content, video clip previews, live video from the content, or other types of content that indicate to a user the content being described by the media guidance data in the listing. With a user input device, a user can select media listings by moving a highlighted region to the media listing or by clicking on the media listing. Selecting a media listing from display 100 may cause the display to change to include information related to the selected media listing (e.g., display 250 (FIG. 2)).

The media guidance application provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Another display arrangement for providing media listings from a plurality of content providers to users in a single interface is shown in FIG. 2. Display 200 includes recommendations region 216. For example, the recommendations region 216 may be populated with recommendations for media assets. The media guidance application may determine which media assets to recommend based on a user profile for the user. Furthermore, the content provider that provides the media assets may not be shown.

Display 250 may include header 202 with: (1) logo 204, which may be associated with the super aggregator; (2) selectable options 206 for selecting content by type, genre, and/or other organization criteria; (3) search box 208 for searching content by text; and (4) user settings 210 for accessing and editing user information and preferences. Display 250 also includes media region 212, information region 214, and recommendations region 216. Media region 212 may include a media asset and may be selectable to view content in full-screen. Information region 214 may include information associated with the media asset, for example, the title, description, duration, rating, and other desired information. Recommendations region 216 may provide media listings with graphical images 218a, 218b, and 218c, including cover art, still images from the content, video clip previews, live video from the content, or other types of content that indicate to a user the content being described by the media guidance data in the listing. Each of the media listings may also be accompanied by text 220a, 220b, and 220c to provide further information about the content associated with the listing. Price indicator 222a provides the price associated with a subscription to a content provider from which the content described in the listing is available. In some embodiments, price indicator 222a may be placed over graphical image 218a. In some embodiments, price indicator 222a may be placed near graphical image 218a in the media listing.

The media listings in display 250 are of the same size, but if desired, the listings may be of different sizes. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
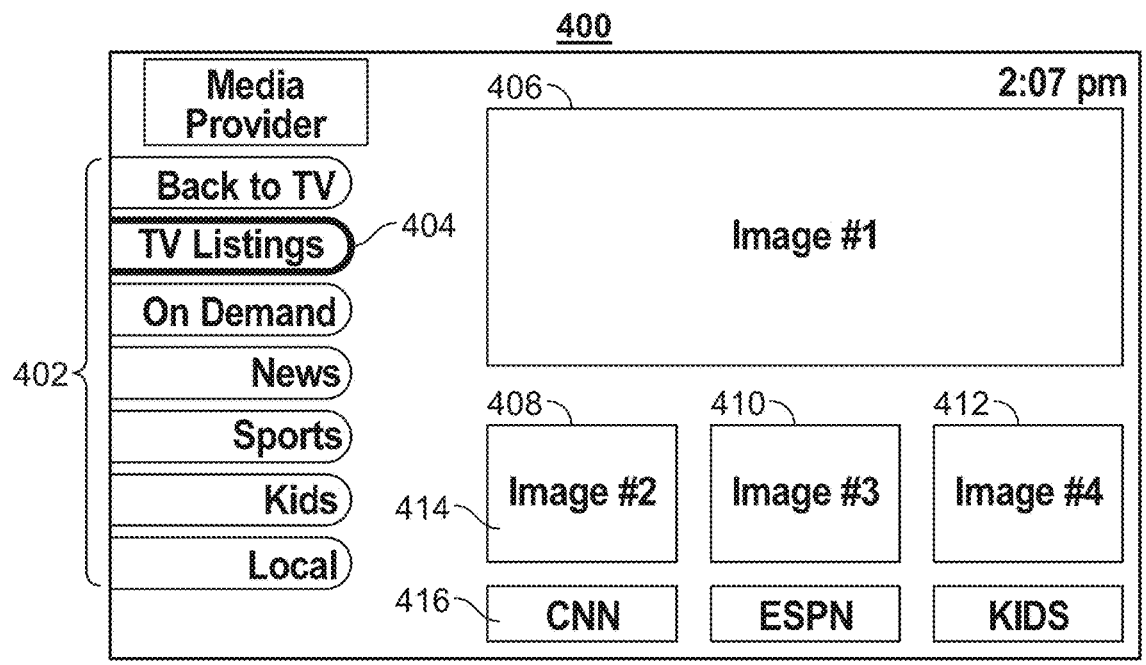
FIG. 4 shows another illustrative media listing display in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows an illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
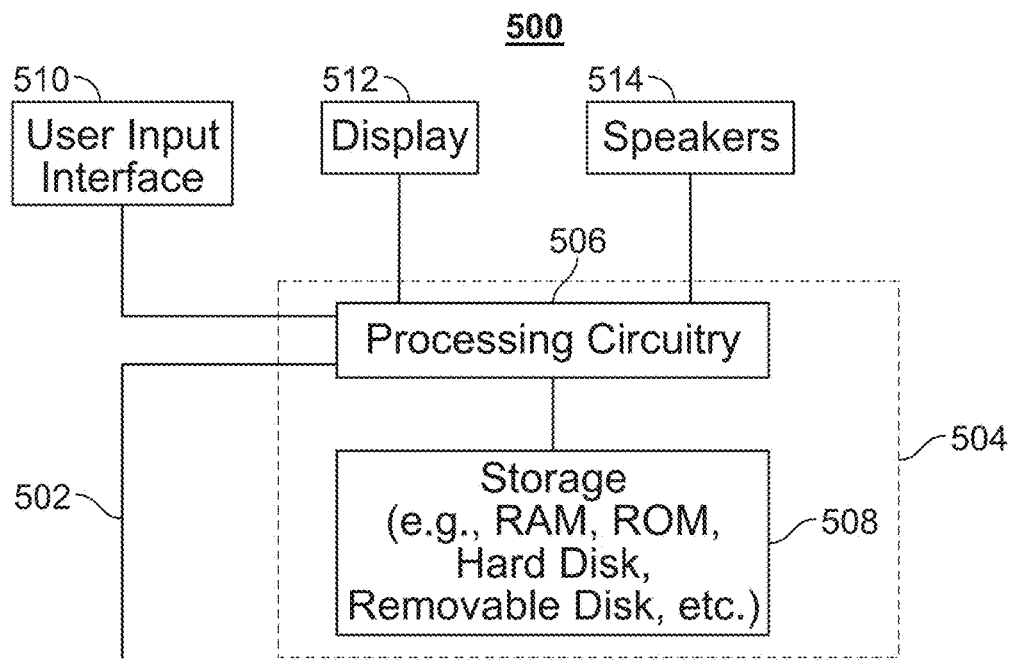
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
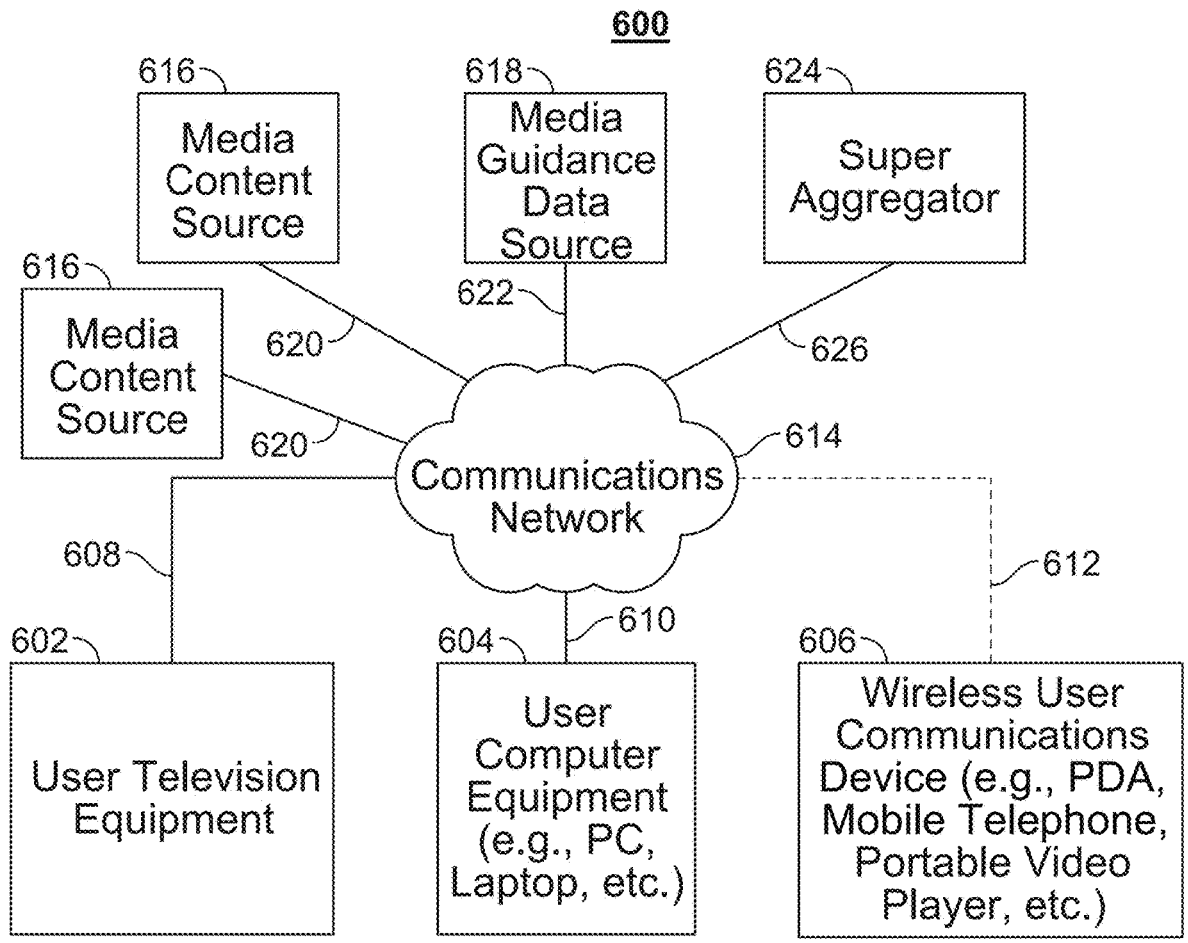
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 6G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1596 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes a super aggregator 624 coupled to communications network 614 via communication path 626. Path 626 may include any of the communication paths described above in connection with paths 608, 610, and 612. Communications with the super aggregator 624 may be exchanged over one or more communications paths, but are shown as a single path in FIG. 6 to avoid overcomplicating the drawing. Although communications between super aggregator 624 with user equipment devices 602, 604, and 606 are shown as through communications network 614, in some embodiments, super aggregator 624 may communicate directly with user equipment devices 602, 604, and 606 via communication paths (not shown) such as those described above in connection with paths 608, 610, and 612.

System 600 includes content sources 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than two of content source 616, but only two are shown in FIG. 6 to avoid overcomplicating the drawing. In addition, there may be more than one of media guidance data source 618, but only one is shown in FIG. 6 to avoid overcomplicating the drawing. (The different types of each of these sources are discussed below.) If desired, a content source 616 and a media guidance data source 618 may be integrated as one source device. Although communications between sources 616 and 618 with super aggregator 624 are shown as through communications network 614, in some embodiments, sources 616 and 618 may communicate directly with super aggregator 624 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

In some embodiments, media guidance data from media guidance data sources 618 and media content from media content sources 616 may be provided to users' equipment by the super aggregator 624. For example, a user equipment device may pull media guidance data and other content from the super aggregator 624 or the super aggregator 624 may push media guidance data and other content to a user equipment device. In addition, the super aggregator 624 may pull media guidance data from media guidance data sources 618 and media content from media content sources 616, or media guidance data sources and media content sources may push media guidance data sources and media content, respectively, to the super aggregator 624.

In some embodiments, the super aggregator 624 may filter media content received from content providers before providing the media content to the users' equipment. Similarly, the super aggregator 624 may filter media guidance data received from media guidance data sources before providing the media content to the users' equipment. For example, the super aggregator may remove any indication of the content provider from media content and media guidance data before providing them to users.

In some embodiments, the super aggregator 624 may provide media content and media guidance data from media content sources and media guidance data sources, respectively, by email or phone to users. For example, the super aggregator may provide a media asset's availability and price by email to users.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,066,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, e.g., in an approach with a super aggregator 624, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include a super aggregator 624, also referred to herein as "cloud-based aggregator," which may provide users with media content from media content sources 616 and media guidance data from media guidance data sources 618. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

As referred to herein, the term "generating for display" means causing, directly or indirectly, the display of media content on a device whether or not the device upon which the media content is displayed is the device that causes the media content to be generated for display. For example, a set-top box may generate for display a media asset by using control circuitry (e.g., graphics processing unit) to generate a signal to be sent to a display device (e.g., TV) to display the media asset. In this example, the set-top box generates the signal used by the display device to display the media asset, therefore the set-top box generates for display the media asset.

Figure 7:
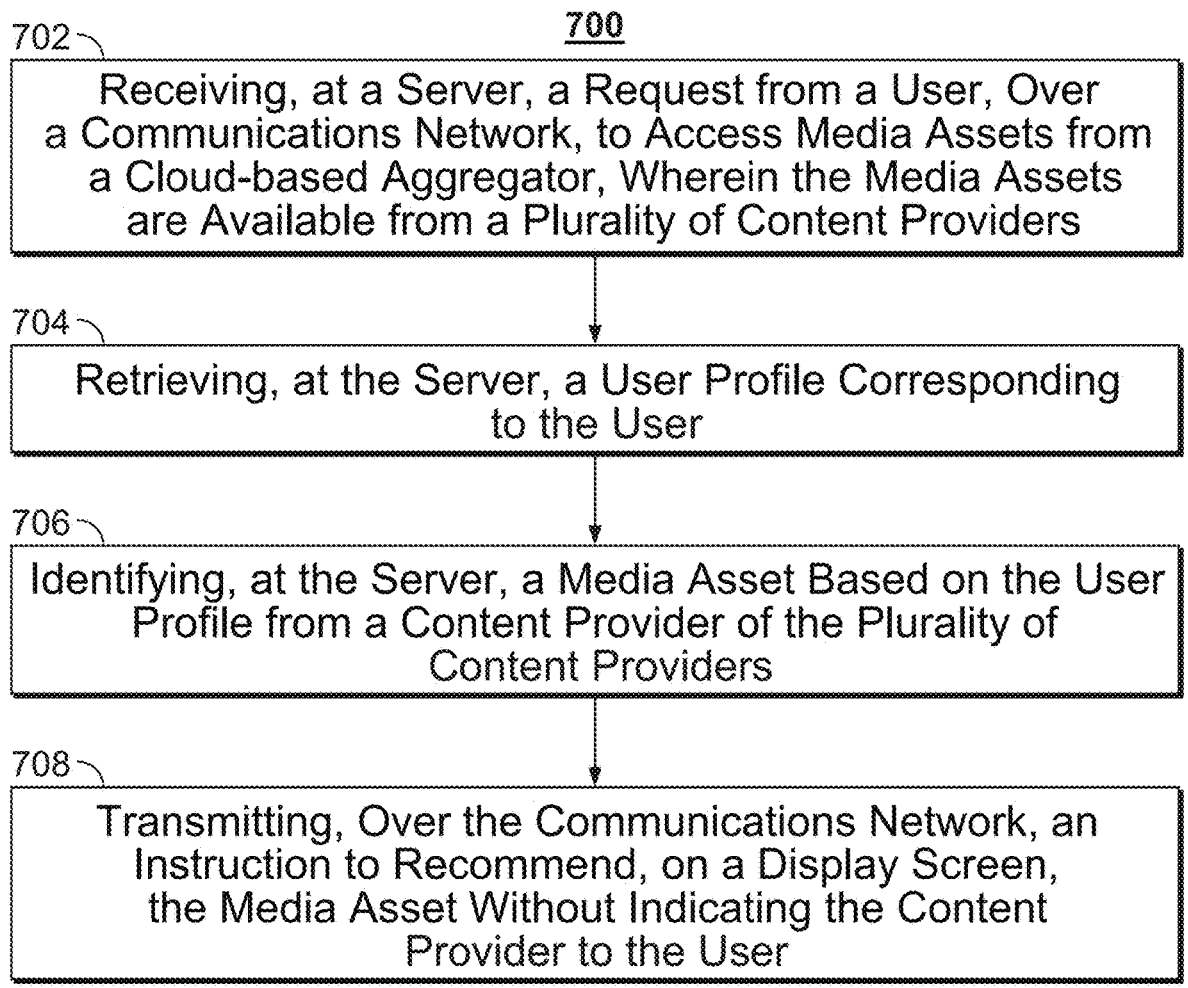
FIG. 7 is a flow-chart of illustrative steps for transmitting an instruction to recommend a media asset without indicating the content provider to the user in accordance with some embodiments of the disclosure.

FIG. 7 is a flowchart of illustrative steps for determining whether a user subscribes to a content provider from which the media asset is available and transmitting an instruction to recommend the media asset to the user based on a user profile without indicating the content provider from which the media asset is available. It should be noted that process 700, or any step thereof, could occur on, or be provided by, any of the devices shown in FIGS. 5-6. For example, process 700 may be executed by control circuitry 504 (FIG. 5) as instructed by the media guidance application (e.g., implemented on any of the devices shown and described in FIG. 6).

In step 702, the media guidance application receives, at a server, a request from a user, over a communications network, to access media assets from a cloud-based aggregator, wherein the media assets are available from a plurality of content providers. For example, the media guidance application may receive a request from a user to access movies. In some embodiments, the request is to access media assets in general. For example, such a request may be received when a user initially accesses the media guidance application to view display 100 (FIG. 1). In some embodiments, the request includes criteria associated with media assets. For example, such a request may be received when a user selects "Movies" from selectable options 106 (FIG. 1). In some embodiments, the request includes information associated with a specific media asset. For example, such a request may be received when a user searches for a movie by its title in the search box 108 (FIG. 1).

In step 704, the media guidance application retrieves, at the server (e.g., super aggregator 624 (FIG. 6)), a user profile corresponding to the user. For example, the media guidance application may retrieve the user's profile including data about the user's preferences and interests.

In step 706, the media guidance application identifies, at the server (e.g., super aggregator 624 (FIG. 6)), a media asset based on the user profile from a content provider (e.g., media content source 616, media guidance data source 618 (FIG. 6)) of the plurality of content providers. For example, the media guidance application may identify a movie available from at least one of the plurality of content providers that is of interest to the user by using the data in the user's profile.

In step 708, the media guidance application transmits, over the communications network (e.g., communications network 614 (FIG. 6)), an instruction to recommend, on a display screen (e.g., display 512 (FIG. 5)), the media asset without indicating the content provider to the user. For example, the media guidance application may transmit an instruction to display a recommendation of the movie to the user, without indicating the content provider from which the movie is available.

In some embodiments, the communications network may utilize an Internet protocol suite. For example, the communication may utilize the Transmission Control Protocol (TCP) and the Internet Protocol (IP).

In some embodiments, the media assets include a first media asset available from a first content provider of the plurality of content providers and a second media asset available from a second content provider of the plurality of content providers. For example, the media assets may include a movie from a first content provider and a song from a different content provider.

In some embodiments, the user profile is an aggregated user profile from the first content provider and the second content provider. For example, the user profile may be a combination of the user's profiles with each content provider. For example, the user profile may include the user's movie preferences in the user profile from a content provider that provides movies, and the user's music preferences in the user profile from a content provider that provides music.

In some embodiments, the media guidance application may identify the media asset based on the user profile by retrieving a plurality of media assets available from the plurality of content providers. For example, the media guidance application may retrieve a list of all the movies available from the plurality of content providers. The media guidance application may determine whether metadata associated with each of the plurality of media assets matches data in the user profile. For example, the media guidance application may compare the genre, rating, and description of each movie with data in the user profile indicating what genres, ratings, and keywords the user has an interest in. The media guidance application may select the media asset based on determining that the media asset has metadata that matches the data in the user profile. For example, the media guidance application may select the movie that is of greatest interest to the user.

In some embodiments, the instruction to recommend the media asset without indicating the content provider to the user further comprises an instruction to generate for simultaneous display, on the display device, a media asset identifier associated with the media asset and a logo associated with the cloud-based aggregator. For example, the media guidance application may generate for display a link to the movie and the logo of the cloud-based aggregator without generating for display an indication of the content provider from which the movie is available.

In some embodiments, the cloud-based aggregator may require a subscription. For example, the cloud-based aggregator may require users to pay a monthly fee to use the aggregator.

In some embodiments, the cloud-based aggregator may manage a user's subscriptions to content providers. For example, the cloud-based aggregator may store a user's subscription information for each content provider. The cloud-based aggregator may receive a user input identifying a content provider, a username associated with the user's subscription to the content provider, and a password associated with the user's subscription to the content provider. For example, the user may provide the cloud-based aggregator with a username and password to one of the content providers.

The cloud-based aggregator may verify the username and the password combination with the content aggregator. For example, the cloud-based aggregator may log in to the content provider's website or application using the username and password provided by the user to verify the username and password.

The cloud-based aggregator may retrieve the type of subscription the user has with the content provider from the content provider. For example, after logging in to the content provider's website or application, the cloud-based aggregator may retrieve the type of subscription the user has with the content provider (e.g., free subscription, premium subscription) and the packages the user subscribes to (e.g., sports packages, movie packages).

The cloud-based aggregator may store the username, the password, and the type of subscription the user has with the content provider. For example, the cloud-based aggregator may store the username, password, and type of subscription in the user profile.

In some embodiments, the cloud-based aggregator may require user authentication. For example, users may have to login to the cloud-based aggregator using a username and password. The cloud-based aggregator may, after authenticating the user, automatically authenticate the user with all content providers that the user subscribes to using the stored subscription information associated with the user. For example, the cloud-based aggregator may login the user to all the content providers that the user has provided a valid username and password combination for.

In some embodiments, the user profile may include the user's subscription information for each content provider of the plurality of content providers. For example, the user profile associated with a user may include the information about the user's subscriptions to the different content providers. For example, the user profile may include the type of subscription the user has with the content provider and authentication information (e.g., username, password).

In some embodiments, the media guidance application may monitor the user's activity on the cloud-based aggregator. For example, the media guidance application may monitor the media assets that a user views as well as the amount of time the user views each media asset. The media guidance application may update the user profile based on the user's activity. For example, the media guidance application may update the user profile to include movies the user has viewed and the amount of time the user viewed each movie. The media guidance application may transmit data in the user profile to a content provider of the plurality of content providers. For example, the media guidance application may transmit the list of movies that a user has viewed to one of the content providers.

In some embodiment, the media guidance application may receive the user's activity on a content provider's website or application from the content provider. For example, the media guidance application may receive (e.g., via communications network 614 (FIG. 6)) information that a user is watching a movie from a content provider. The media guidance application may store the user's activity in the user profile. For example, the media guidance application may add information that a user is watching the movie to the user profile.

In some embodiments, the media guidance application may transmit an instruction to recommend the media asset without indicating the content provider to the user by identifying content providers from which the media asset is available. For example, the media guidance application may identify the content providers from which the movie is available. The media guidance application may determine whether the user subscribes to at least one content provider of the content providers from which the media asset is available. For example, the media guidance application may determine whether any of the content providers that the user subscribes to offer the movie.

The media guidance application may, in response to determining that the user subscribes to at least one content provider of the content providers from which the media asset is available, transmit an instruction to generate for display, on the display device, a media asset identifier associated with the media asset without indicating the at least one content provider to the user. For example, the media guidance application may, in response to determining that the user subscribes to a content provider that offers the movie, generate for display a recommendation of the movie without indicating the content provider.

The media guidance application may, in response to determining that the user does not subscribe to at least one content provider of the content providers from which the media asset is available, transmit an instruction to generate for simultaneous display, on the display device, a media asset identifier associated with the media asset and a price associated with subscribing to one of the at least one content provider without indicating the content provider to the user. For example, the media guidance application may, in response to determining that the user does not subscribe to a content provider that offers the movie, generate for simultaneous display a recommendation of the movie and a price associated with subscribing to a content provider that offers the movie.

In some embodiments, the cloud-based aggregator may include a database listing a plurality of media asset identifiers associated with media assets available from the plurality of content providers, wherein each media asset identifier is associated with content providers from which the media asset associated with the media asset identifier is available. For example, the cloud-based aggregator may include a database of all movies available from all the content providers, associating each movie with the content providers from which the movie is available.

In some embodiments, the media guidance application may receive an advertisement from an advertiser to be distributed to users. For example, the media guidance application may receive a car commercial from an advertiser to be delivered to a target audience. The advertisement may include information about a target audience. For example, the advertisement may include information about who it is targeting. For example, a car commercial may target users who are older than sixteen, have a driver's license, and like cars.

In some embodiments, the media guidance application may provide an advertisement to a user based on a user profile. For example, the media guidance application may direct a car commercial to a user whose profile indicates an interest in cars. The media guidance application may compare the information about the target audience with the information in a user profile associated with a user to determine whether the user is in the target audience. For example, the media guidance application may compare a user's age according to the user's profile to the target age range in the information in the advertisement. This provides the benefit of delivering advertisements that are relevant or of interest to users.

In some embodiments, the user profile may include the user's viewing and purchasing history. For example, the user profile may include a list of the movies the user has viewed and a list of products or services the user has purchased. In some embodiments, the user profile may include a user identifier, generated to replace the user's name in the user profile. For example, the user profile may include a unique number used to identify the user instead of using the user's name. This provides the benefit of maintaining users' privacies.

In some embodiments, the media guidance application provides the advertisement directly to the user. For example, the media guidance application may generate for display a car commercial when the user is viewing content provided by the media guidance application. In some embodiments, the media guidance application delivers the advertisements indirectly to the user through a content provider. For example, the media guidance application may transmit the car commercial to a content provider that the user is using and the content provider may then generate for display the car commercial to the user. This provides the benefit of continuously delivering targeted advertisements to user, even when using different websites and applications to view media content.

In some embodiments, the media guidance application may receive information from a content provider about a user's activities on a website or in an application associated with the content provider. For example, the media guidance application may receive (e.g., via communications network 614 (FIG. 6)) information from a content provider that a user is watching a movie about street racing. The media guidance application may update a user profile associated with the user to include the information received from the content provider. For example, the media guidance application may update the user's profile to include the fact that the user is viewing the movie about street racing. The media guidance application may identify an advertisement based on the user profile. For example, the media guidance application may identify a car commercial as being of interest to the user based on the user's profile. The media guidance application may transmit the advertisement to the content provider to be delivered to the user. For example, the media guidance application may transmit the car commercial to the content provider for the content provider to display it to the user.

The media guidance application may share the revenue associated with delivering the advertisement to the user with the content provider. This provides the benefit of incentivizing content providers to share a user's activities with the media guidance application and help distribute advertisements to the user. With the media guidance application being at the center of the information sharing, the media guidance application will have the most information on the user and will be able to determine the most relevant advertisements to deliver to the user.

In some embodiments, the media guidance application transmits a report to a content provider including advertisement distribution information. For example, the media guidance application may send a content provider a report of all of the advertisements delivered to users and how much revenue that created. The distribution information may include: advertisement identifiers; numbers of times each advertisement associated with an advertisement identifier was viewed; and revenue shared with the content provider for delivering the advertisements.

In some embodiments, the media guidance application monitors the distribution of advertisements to users. For example, the media guidance application may keep track of the advertisements that are delivered to the users, both directly and indirectly.

In some embodiments, the media guidance application may determine revenue generated from advertisers. For example, the media guidance application may determine the amount received from advertisers to have the advertisements distributed to users. In some embodiments, the media guidance application may share the revenue generated from advertisements with content providers. For example, after delivering a car commercial to a content provider to be displayed to a user, the media guidance application may share part of the revenue received from the advertiser with the content provider. This provides the benefit of incentivizing content providers to help deliver advertisements to users.

In some embodiments, the media guidance application monitors a user's interaction with an advertisement. For example, the media guidance application may keep track of whether a user saw the advertisement, whether the user clicked the advertisement, whether the user bought the product or service associated with the advertisement. The media guidance application may store the user's interaction with the advertisements in a user profile associated with the user. For example, the media guidance application may store the fact that a user viewed and clicked on a car commercial advertisement in the user's profile. In some embodiments, the user's interaction with the advertisements may include an advertisement identifier associated with the advertisement, an indication of whether the user viewed the advertisement, an indication of whether the user clicked the advertisement, and an indication of whether the user purchased the product or service associated with the advertisement.

In some embodiments, the media guidance application may provide service providers with a finder's fee for sharing information about media assets that a user is interested in viewing. The media guidance application may receive information identifying a media asset of interest to a user from a first service provider. For example, the media guidance application may receive information from a first music service provider identifying an album that a user is interested in listening to. The media guidance application may determine that the media asset is available from a second service provider. For example, the media guidance application may determine that the album is available to listen to from a second music provider. The media guidance application may inform the user that the media asset is available from the second service provider. For example, the media guidance application may generate for display a recommendation of the album including information about its availability from the second music service provider. The media guidance application may receive a user input to access the media asset from the second service provider. For example, the user may click on the recommendation to access the album from the second music service provider.

The media guidance application may receive compensation from the second service provider for directing the user to use the second service provider's service. For example, the media guidance application may receive a monetary fee from the second music service provider for directing the user to listen to the album. The media guidance application may share the compensation with the first service provider. For example, the media guidance application may share the monetary fee received from the second music service provider with the first music service provider. Sharing the finder's fee with the first service provider incentivize the service provider to share users' interests in media assets. The second service provider receives the benefit of users using the service. Finally, the users have the benefit of viewing the media assets that they desire.

Figure 8:
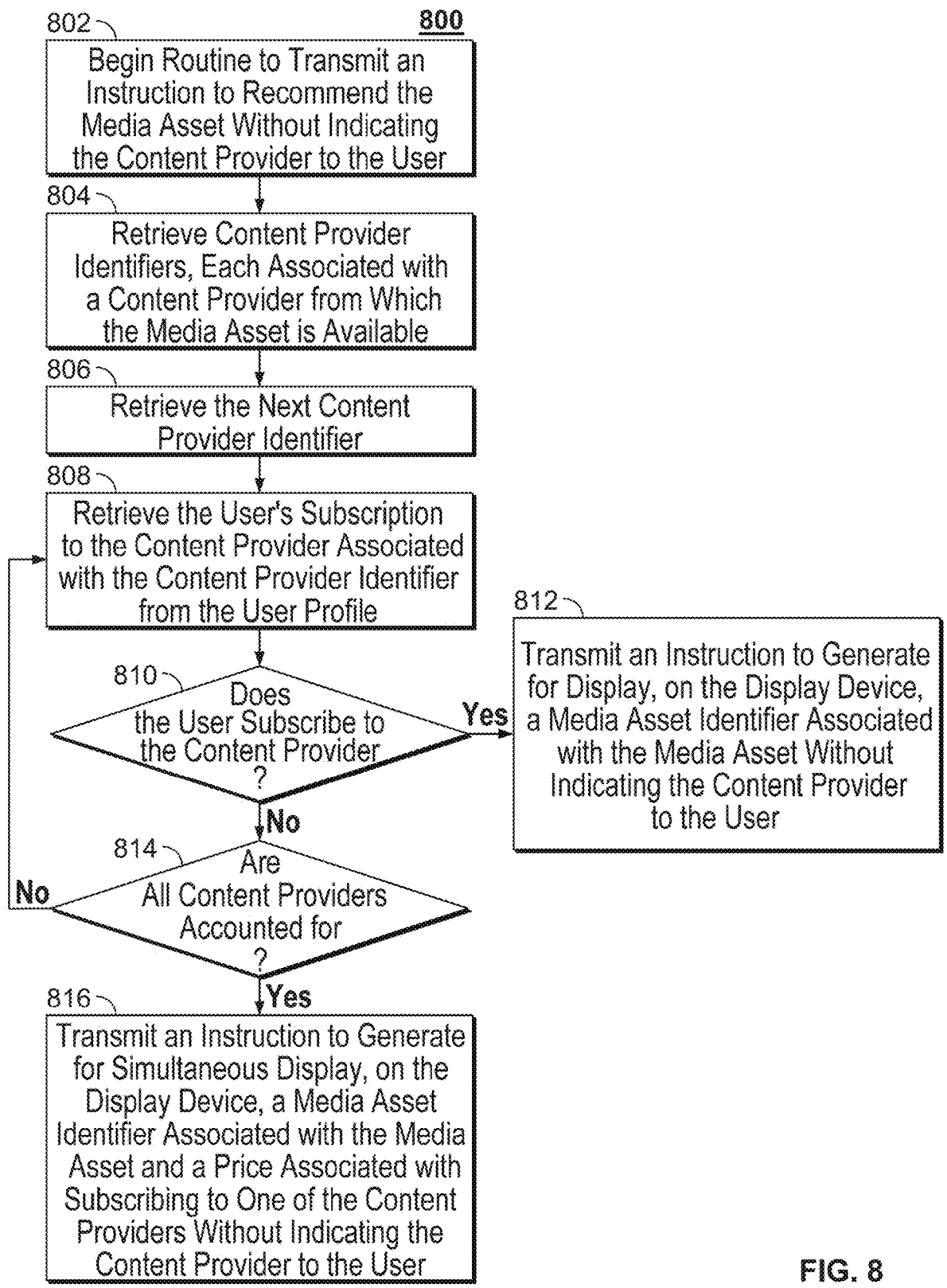
FIG. 8 is a flowchart of illustrative steps for determining whether the user subscribes to a content provider from which the media asset is available and transmitting an instruction to recommend the media asset in accordance with some embodiments of the disclosure.

FIGS. 8 and 9 present processes for control circuitry (e.g., control circuitry 504) to determine whether the user subscribes to a content provider from which the media asset is available and to transmit an instruction to recommend the media asset without indicating the content provider to the user in accordance with some embodiments of the disclosure. In some embodiments this algorithm may be encoded on to non-transitory storage medium (e.g., storage device 508) as a set of instructions to be decoded and executed by processing circuitry (e.g., processing circuitry 506). Processing circuitry may in turn provide instructions to other sub-circuits contained within control circuitry 504, such as the tuning, video generating, encoding, decoding, encrypting, decrypting, scaling, analog/digital conversion circuitry, and the like.

The flowchart in FIG. 8 describes a process implemented on control circuitry (e.g., control circuitry 504) to transmit an instruction to recommend the media asset without indicating the content provider to the user in accordance with some embodiments of the disclosure.

At step 802, control circuitry 504 to determine whether the user subscribes to a content provider from which the media asset is available and to transmit an instruction to recommend the media asset without indicating the content provider to the user will begin after identifying a media asset. In some embodiments, this may be done either directly or indirectly in response to a user action or input (e.g., from signals received by control circuitry 504 or user input interface 510). For example, the process may begin directly in response to control circuitry 504 receiving signals from user input interface 510, or control circuitry 504 may prompt the user to confirm their input using a display (e.g., by generating a prompt to be displayed on display 512) prior to running the algorithm.

At step 804, control circuitry 504 retrieves content provider identifiers, each associated with a content provider from which the media asset is available. In some embodiments, the content provider identifiers may be stored as part of a larger data structure, and control circuitry 504 may retrieve the value of a content provider by executing appropriate accessor methods to retrieve the value from the larger data structure.

At step 806, control circuitry 504 proceeds to retrieve the next content provider identifier from stored memory. In some embodiments control circuitry 504 may receive a single primitive data structure that represents the value of the content provider identifier. In some embodiments the value may be stored as part of a larger data structure, and control circuitry 504 may retrieve the value by executing appropriate accessor methods to retrieve the value from the larger data structure.

At step 808, control circuitry 504 proceeds to retrieve the user's subscription to the content provider associated with the content provider identifier from the user profile. In some embodiments, the value of each of the user's subscriptions may be stored (e.g., on storage device 508) prior to beginning the process. In some embodiments the value of each of the user's subscription may also be retrieved for each and every instance of the content provider identifier.

At step 810, control circuitry 504 compares the values of having a subscription and the user's subscription to determine if the user subscribed to the content provider associated with the content provider identifier. In some embodiments, control circuitry 504 may directly compare the value of the user's subscription with a value associated with having a subscription (e.g., the boolean True) by accessing the value and performing a value comparison. In some instances, control circuitry 504 may call a comparison function (e.g., for object to object comparison) to compare the user's subscription and the value of having a subscription. If the condition is satisfied, the algorithm may proceed to step 812; if the condition is not satisfied, the algorithm may proceed to step 814 instead.

At step 812, control circuitry 504 executes a subroutine to transmit an instruction to generate for display, on the display device, a media asset identifier associated with the media asset without indicating the at least one content provider to the user based on the condition at step 810 being satisfied.

At step 814, control circuitry 504 checks if all instances of content provider identifiers are accounted for. If all of the instances have been evaluated, control circuitry 504 may proceed to step 816. For example, control circuitry 504 may call a function to see if there is a next content provider identifier. If the function returns true (i.e., there are still instances that need to be processed), control circuitry 504 may proceed to step 806. Otherwise, control circuitry 504 may proceed to step 820.

At step 820, control circuitry 504 executes a subroutine to transmit an instruction to generate for simultaneous display, on the display device, a media asset identifier associated with the media asset and a price associated with subscribing to one of the at least one content provider without indicating the content provider to the user.

It is contemplated that the descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations, such as those at 808 and 812, may be performed in any order or in parallel or simultaneously to reduce lag or increase the speed of the system or method. As a further example, in some embodiments several instances of content provider identifier may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 5-4 could be used to implement one or more portions of the process.

The pseudocode in FIG. 9 describes a process to determine whether the user subscribes to a content provider from which the media asset is available and to transmit an instruction to recommend the media asset without indicating the content provider to the user in accordance with some embodiments of the disclosure. It will be evident to one skilled in the art that the process described by the pseudocode in FIG. 9 may be implemented in any number of programming languages and a variety of different hardware, and that the style and format should not be construed as limiting, but rather a general template of the steps and procedures that would be consistent with code used to implement some embodiments of this disclosure.

At line 901, control circuitry 504 runs a subroutine to initialize variables and prepare to determine whether the user subscribes to a content provider from which the media asset is available and to transmit an instruction to recommend the media asset without indicating the content provider to the user, which begins on line 908. For example, in some embodiments control circuitry 504 may copy instructions from non-transitory storage medium (e.g., storage device 508) into RAM or into the cache for processing circuitry 506 during the initialization stage. Additionally, in some embodiments the value of each of the user's subscriptions being used for comparison may be retrieved, set, and stored at 901.

Line 903 includes a comment describing the purpose of the subroutine. In some embodiments, control circuitry 504 ignores the comment. In some embodiments, the comment is at the top of the code or on any other line in the code. In some embodiments, the comment is more specific by describing the purpose of specific variables and lines in the code. In some embodiments, the comment is missing entirely.

At line 905, control circuitry 504 retrieves content provider identifiers, each associated with a content provider from which the media asset is available. In some embodiments these instances may be retrieved from stored memory (e.g., storage 508). In some embodiments these instances may be retrieved from a server (e.g., via communications network 614). Control circuitry 504 may receive content provider identifiers by receiving, for example, a pointer to an array of values of content provider identifiers. In another example, control circuitry 504 may receive an object of a class, such as an iterator object containing content provider identifiers.

At line 906, control circuitry 504 iterates through the various content provider identifiers, if only a single instance is available, the loop will only execute once. This loop may be implemented in multiple fashions depending on the choice of hardware and software language used to implement the algorithm of FIG. 9; for example, this may be implemented as part of a "for" or "while" loop.

At line 907, control circuitry 504 retrieves the user's subscription to the content provider associated with the content provider identifier from the user profile. Similar to the content provider identifiers, in some embodiments the value of the user's subscription will be stored as part of a larger data structure or class, and the value of the user's subscription may be obtained through accessor methods. In some embodiments the user's subscription may be converted from a string or other non-numeric data type into a numeric data type by means of an appropriate hashing algorithm, or the user's subscription may be a primitive data structure, and may be directly used in the comparisons at line 909.

At line 909, control circuitry 504 compares the value of the user's subscription to the value of having a subscription to see if the user subscribes to the content provider associated with the content provider identifier.

At line 910, control circuitry 504 executes a subroutine to transmit an instruction to generate for display, on the display device, a media asset identifier associated with the media asset without indicating the at least one content provider to the user using communications network 614, if the condition in line 909 is satisfied. In some embodiments this may be achieved by processing circuitry 506 sending the appropriate signals to communications circuitry.

At line 912, control circuitry 504 determines whether the user does not subscribe to any of the content providers associated with the content provider identifiers processed. In some embodiments, control circuitry may initialize a variable indicating whether the user subscribes to at least one of the content providers to FALSE in the initialization subroutine in line 901. Control circuitry 504 may then update the value to TRUE if the condition in line 909 is satisfied. Control circuitry 504 may then compare the value of the variable to the value FALSE at line 912 to determine whether the user does not subscribe to any of the content providers.

At line 913, control circuitry 504 executes subroutine to transmit an instruction to generate for simultaneous display, on the display device, a media asset identifier associated with the media asset and a price associated with subscribing to the content provider without indicating the content provider to the user using communications circuitry if the condition at line 912 is satisfied.

At line 915, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 900 described by the pseudocode in FIG. 9 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 910 to speed up the operation, or the conditional statements may be replaced with a case-switch. In some embodiments, rather than iterating over all content provider identifiers at step 806, in some embodiments the code may be rewritten so control circuitry 504 is instructed to evaluate multiple content provider identifiers simultaneously on a plurality of processors or processor threads, lowering the number of iterations needed and potentially speeding up computation time.

Figure 10:
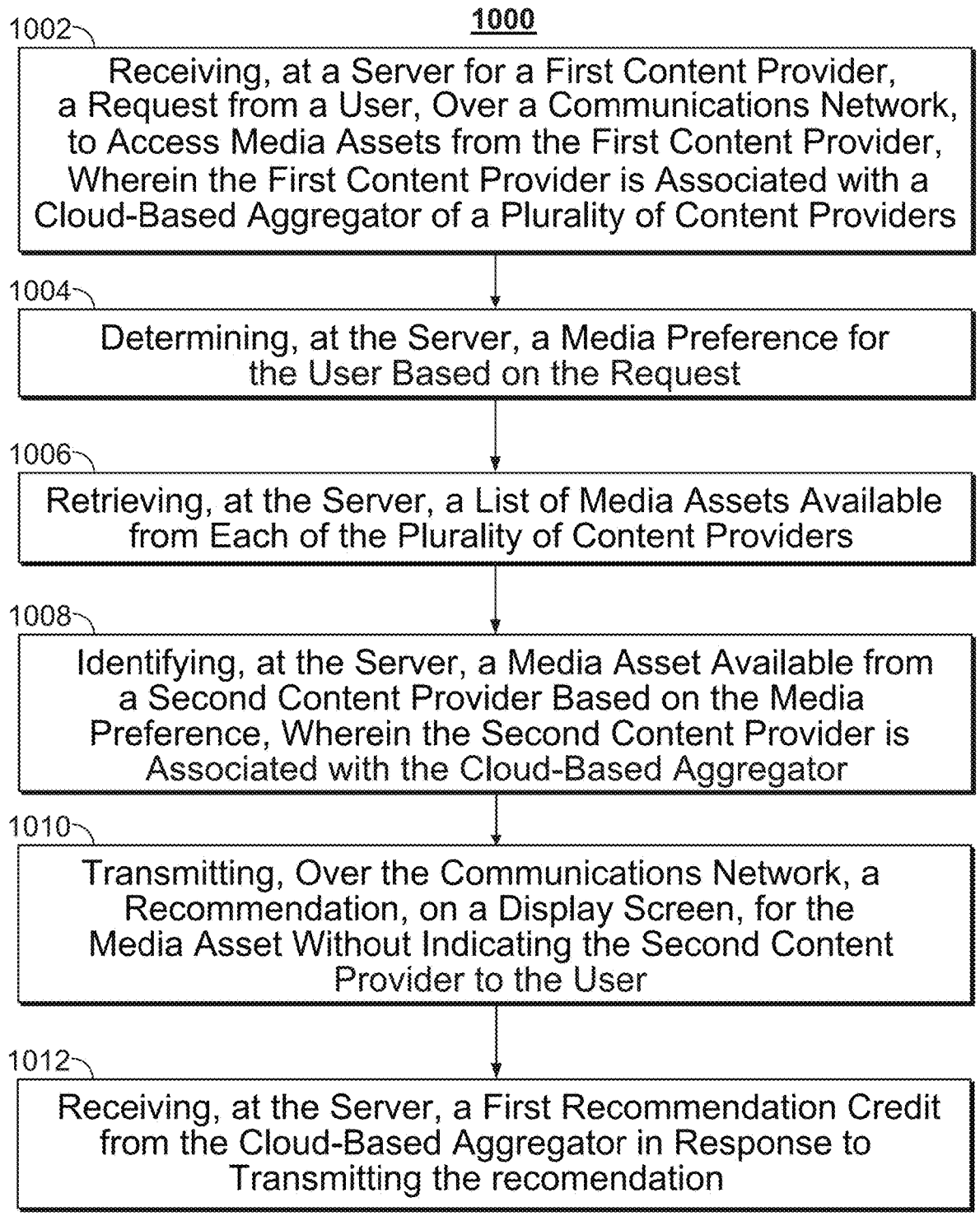
FIG. 10 is a flow-chart of illustrative steps for recommending media content to users based on the users' media preferences in accordance with some embodiments of the disclosure.

FIG. 10 is a flowchart of illustrative steps for recommending media content to users based on the users' media preferences. It should be noted that process 1000, or any step thereof, could occur on, or be provided by, any of the devices shown in FIGS. 5-6. For example, process 1000 may be executed by control circuitry 504 (FIG. 5) as instructed by the media guidance application (e.g., implemented on any of the devices shown and described in FIG. 6).

In step 1002, the media guidance application receives, at a server, a request from a user, over a communications network, to access media assets from a first content provider, wherein the first content provider is associated with a cloud-based aggregator of a plurality of content providers. For example, the media guidance application may receive a request from the user to access a music album from a first music service provider.

In step 1004, the media guidance application determines, at the server, a media preference for the user based on the request. For example, the media guidance application may determine the media preference to be the music album identified in the user's request.

In step 1006, the media guidance application retrieves, at the server, a list of media assets available from each of the plurality of content providers. For example, the media guidance application may retrieve a list of music albums available from all of the content providers associated with the cloud-based aggregator.

In step 1008, the media guidance application identifies, at the server, a media asset available from a second content provider based on the media preference, wherein the second media provider is associated with the cloud-based aggregator. For example, a second music service provider may be associated with the cloud-based aggregator and the media guidance application may identify the music album as being available from the second music service provider.

In step 1010, the media guidance application transmits, over the communications network, a recommendation, on a display screen, for the media asset without indicating the second content provider to the user. For example, the media guidance application may transmit a recommendation of the music album from the second music service provider, to be displayed for the user without indicating that the second music service provider is the source of the music album.

In step 1012, the media guidance application receives, at the server, a first recommendation credit from the cloud-based aggregator in response to transmitting the recommendation. For example, the media guidance application may receive a recommendation credit for the first music service provider for transmitting the recommendation of the music album.

In some embodiments, the media preference uniquely identifies a media asset that is of interest to the user. For example, the media preference may be the title of a music album, or any other identifier of the media asset.

In some embodiments, the media preference includes media asset attributes that the user is interested in. For example, the media preference may include a media asset type, genre, rating, length, artists, etc. that the user is interested in. For example, the media preference may be a list of media asset attributes such as song, country, and Kanye West.

In some embodiments, the media asset is not available from the first content provider. For example, the music album that the user is interested in may not be available for listening from the first music service provider.

In some embodiments, the recommendation includes a link to the media asset from the second content provider. For example, the recommendation may include a link that the user may click on to view the media asset from the second content provider.

In some embodiments, the first recommendation credit is a monetary fee. For example, the first recommendation credit may be a digital payment. For example, the first recommendation credit may be money that is exchanged digitally.

In some embodiments, the first recommendation credit is a digital credit added to an account associated with the first content provider. For example, the media guidance application may add and subtract recommendation credits from an account associated with the first content provider, keeping track of the total amount of recommendation credits that the first content provider possesses. The digital credits may be exchanged for money or other benefits. In some embodiments, the digital credits may be exchanged at the request of the content provider. In some embodiments, the digital credits may be exchanged at the end of a predetermined time period.

In some embodiments, the cloud-based aggregator receives a second recommendation credit from the second content provider. For example, after recommending a music album on a second music service provider to a user, the media guidance application may receive a recommendation credit from the second music service provider. In some embodiments, the second recommendation credit has a value that is greater than or equal to the value of the first recommendation credit.

In some embodiments, the media guidance application may generate for display, on the display screen, a menu, associated with the cloud-based aggregator, for receiving requests from the user to access media assets from the first content provider, wherein the menu does not indicate that the media assets are from the first content provider. For example, the media guidance application may generate for display, on the user's display, a menu of songs and albums available from a first music service provider, without indicating that the first music service provider is the source of the media assets.

In some embodiments, the media guidance application may receive from the cloud-based aggregator a verification of a right of the first user to access media assets from the second content provider. For example, the media guidance application may receive, from the cloud-based aggregator, verification that the user has the right to access media assets from a second music service provider. The media guidance application may, in response to receiving from the cloud-based aggregator the verification of the right of the second user to access media assets from the first content provider, search for the media asset available from the second content provider based on the media preference. For example, after verifying that the user has the right to access media content from the second music service provider, the media guidance application may search the second music service provider for the song or album that the user is interested in.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of recommending content from alternative content providers, the method comprising:
   receiving, at a server associated with a plurality of content providers, via a communications network, a request to access content from a first content provider of a plurality of content providers, the request identifying a requested content item;
   determining, at the server, that the requested content item is not available from the first content provider;
   accessing, by the server, one or more preferences based on the requested content item;
   identifying, at the server, a plurality of second content items from a subset of the plurality of content providers based on the one or more preferences, the subset of the plurality of content providers not including the first content provider;
   accessing, by the server, subscription data for each of the plurality of content providers;
   selecting, by the server, one of the plurality of second content items as a selected content item based at least in part on the subscription data of the corresponding content provider; and
   transmitting, via the communications network, a command to cause display of a recommendation, on a display screen, of the selected content item without indicating the selected content item is from a source other than the first content provider.

2. The method of claim 1, wherein the one or more preferences uniquely identifies the requested content item.

3. The method of claim 1, wherein the one or more preferences include attributes related to the requested content item.

4. The method of claim 1, wherein the recommendation includes a link to the selected content item from the corresponding content provider.

5. The method of claim 1, wherein the subscription data identifies which of the plurality of content providers has a current subscription.

6. The method of claim 1, wherein the subscription data identifies which of the plurality of content providers has a free trial subscription.

7. The method of claim 1, wherein the subscription data identifies which of the plurality of content providers had a previously terminated subscription.

8. A system of recommending content from alternative content providers, the system comprising:
a server associated with a plurality of content providers, the server including:
a first input/output circuitry configured to:
receive, via a communications network, a request to access content from a first content provider of a plurality of content providers, the request identifying a requested content item;
access one or more preferences based on the requested content item;
access subscription data for each of the plurality of content providers processing circuitry configured to:
determine that the requested content item is not available from the first content provider;
identify a plurality of second content items from a subset of the plurality of content providers based on the one or more preferences, the subset of the plurality of content providers not including the first content provider;
select one of the plurality of second content items as a selected content item based at least in part on the subscription data of the corresponding content provider; and
a second input/output circuitry configured to:
transmit, via the communications network, a command to cause display of a recommendation, on a display screen, of the selected content item without indicating the selected content item is from a source other than the first content provider.

9. The system of claim 8, wherein the one or more preferences uniquely identifies the requested content item.

10. The system of claim 8, wherein the one or more preferences include attributes related to the requested content item.

11. The system of claim 8, wherein the recommendation includes a link to the selected content item from the corresponding content provider.

12. The system of claim 8, wherein the subscription data identifies which of the plurality of content providers has a current subscription.

13. The system of claim 8, wherein the subscription data identifies which of the plurality of content providers has a free trial subscription.

14. The system of claim 8, wherein the subscription data identifies which of the plurality of content providers had a previously terminated subscription.

15. A non-transitory computer-readable medium having instructions encoded thereon that when executed by control circuitry cause the control circuitry to:
receive, at a server associated with a plurality of content providers, via a communications network, a request to access content from a first content provider of a plurality of content providers, the request identifying a requested content item;
determine, at the server, that the requested content item is not available from the first content provider;
access, by the server, one or more preferences based on the requested content item;
identify, at the server, a plurality of second content items from a subset of the plurality of content providers based on the one or more preferences, the subset of the plurality of content providers not including the first content provider;
access, by the server, subscription data for each of the plurality of content providers;
select, by the server, one of the plurality of second content items as a selected content item based at least in part on the subscription data of the corresponding content provider; and
transmit, via the communications network, a command to cause display of a recommendation, on a display screen, of the selected content item without indicating the selected content item is from a source other than the first content provider.

16. The non-transitory computer-readable medium of claim 15, wherein the one or more preferences uniquely identifies the requested content item.

17. The non-transitory computer-readable medium of claim 15, wherein the one or more preferences include attributes related to the requested content item.

18. The non-transitory computer-readable medium of claim 15, wherein the subscription data identifies which of the plurality of content providers has a current subscription.

19. The non-transitory computer-readable medium of claim 15, wherein the subscription data identifies which of the plurality of content providers has a free trial subscription.

20. The non-transitory computer-readable medium of claim 15, wherein the subscription data identifies which of the plurality of content providers had a previously terminated subscription.

* * * * *